United States Patent
Coerman et al.

(10) Patent No.: US 11,766,911 B2
(45) Date of Patent: Sep. 26, 2023

(54) SITUATION-DEPENDENT DAMPING OF THE VERTICAL WHEEL OSCILLATION

(71) Applicant: Ford Global Technologies, LLC, Dearborn, MI (US)

(72) Inventors: Cyril Coerman, Leverkusen (DE); Uwe Hoffmann, Leverkusen (DE); Georg Johann Maurer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/901,042

(22) Filed: Sep. 1, 2022

(65) Prior Publication Data

US 2023/0071791 A1 Mar. 9, 2023

(30) Foreign Application Priority Data

Sep. 9, 2021 (DE) .......................... 102021123390.9

(51) Int. Cl.
*B60G 17/0165* (2006.01)

(52) U.S. Cl.
CPC .... *B60G 17/0165* (2013.01); *B60G 2400/202* (2013.01); *B60G 2500/102* (2013.01); *B60G 2500/104* (2013.01)

(58) Field of Classification Search
CPC .......... B60G 17/0165; B60G 2400/202; B60G 2500/102; B60G 2500/104
See application file for complete search history.

(56) References Cited

U.S. PATENT DOCUMENTS

| | | | |
|---|---|---|---|
| 5,432,700 A | 7/1995 | Hrovat et al. | |
| 5,497,324 A | 3/1996 | Henry et al. | |
| 8,938,333 B2 | 1/2015 | Bose et al. | |
| 9,446,651 B2 | 9/2016 | Giovanardi et al. | |
| 9,738,132 B2 | 8/2017 | Norton et al. | |
| 10,065,474 B2 | 9/2018 | Trangbaek | |
| 10,363,790 B2 * | 7/2019 | Hoffmann | B60G 17/02 |
| 10,828,955 B1 * | 11/2020 | Edren | B60G 17/0528 |
| 11,110,770 B2 * | 9/2021 | Kim | B60G 17/019 |
| 11,524,542 B2 * | 12/2022 | Kim | B60G 17/01908 |
| 2013/0345933 A1 * | 12/2013 | Norton | B60G 17/08 701/37 |
| 2014/0303844 A1 * | 10/2014 | Hoffmann | B60G 17/08 701/37 |
| 2017/0157023 A1 | 6/2017 | Neuba et al. | |
| 2020/0023705 A1 * | 1/2020 | Hirao | B60G 17/0165 |

(Continued)

FOREIGN PATENT DOCUMENTS

DE 102020205317 A1 11/2020

*Primary Examiner* — Toan C To
(74) *Attorney, Agent, or Firm* — Lorne Forsythe; Price Heneveld LLP (57) ABSTRACT

A method is provided for diminishing the effect of roadway anomalies on a vehicle by dynamically adjusting an actuating element for regulating damper forces of a vibration damper of a vehicle wheel when passing over a roadway anomaly, in particular a pothole, wherein, when the falling edge of the roadway anomaly is reached, the actuating element is switched into its hardest setting and, when the rising edge of the roadway anomaly is reached, the force request is set equal to 0 and, thereafter, a force request is calculated based on the parameters of the vehicle and the suspension and is transmitted to the damping.

12 Claims, 7 Drawing Sheets

(56) References Cited

U.S. PATENT DOCUMENTS

| | | | |
|---|---|---|---|
| 2021/0053409 A1* | 2/2021 | Kim | B60G 17/06 |
| 2021/0162832 A1* | 6/2021 | Hwang | B60G 17/06 |
| 2021/0354523 A1* | 11/2021 | Hirao | F16F 15/02 |
| 2022/0105772 A1* | 4/2022 | Kim | B60G 17/0165 |
| 2022/0105776 A1* | 4/2022 | Kim | B60G 17/0165 |

* cited by examiner

| Deflection of the suspension $S_{Susp}$ | Speed of compression $v_{SuspAct}$ | | | | | | | | | | |
|---|---|---|---|---|---|---|---|---|---|---|---|
| | 0 | 0.1 | 0.2 | 0.3 | 0.4 | 0.5 | 0.6 | 0.7 | 0.8 | 0.9 | 1 |
| 0 | 1 | 1 | 1 | 1 | 1 | 1 | 1 | 1 | 1 | 1 | 1 |
| -0.05 | 0.833333 | 0.833333 | 0.833333 | 0.833333 | 0.833333 | 0.833333 | 0.833333 | 0.833333 | 0.833333 | 0.833333 | 0.833333 |
| -0.1 | 0.666667 | 0.666667 | 0.666667 | 0.666667 | 0.666667 | 0.666667 | 0.666667 | 0.666667 | 0.666667 | 0.666667 | 0.666667 |
| -0.15 | 0.5 | 0.5 | 0.5 | 0.5 | 0.5 | 0.5 | 0.5 | 0.5 | 0.5 | 0.5 | 0.5 |
| -0.2 | 0.333333 | 0.333333 | 0.333333 | 0.333333 | 0.333333 | 0.333333 | 0.333333 | 0.333333 | 0.333333 | 0.333333 | 0.333333 |
| -0.25 | 0.166667 | 0.166667 | 0.166667 | 0.166667 | 0.166667 | 0.166667 | 0.166667 | 0.166667 | 0.166667 | 0.166667 | 0.166667 |
| -0.3 | 0 | 0 | 0 | 0 | 0 | 0 | 0 | 0 | 0 | 0 | 0 |
| -0.35 | 0 | 0 | 0 | 0 | 0 | 0 | 0 | 0 | 0 | 0 | 0 |
| -0.4 | 0 | 0 | 0 | 0 | 0 | 0 | 0 | 0 | 0 | 0 | 0 |

Fig. 4

| Deflection of the suspension $S_{Susp}$ \ Speed of compression $v_{SuspAct}$ | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0 | 1 | 0.8 | 0.6 | 0.4 | 0.2 | 0 | 0 | 0 | 0 | 0 | 0 |
| -0.05 | 1 | 0.8 | 0.6 | 0.4 | 0.2 | 0 | 0 | 0 | 0 | 0 | 0 |
| -0.1 | 1 | 0.8 | 0.6 | 0.4 | 0.2 | 0 | 0 | 0 | 0 | 0 | 0 |
| -0.15 | 1 | 0.8 | 0.6 | 0.4 | 0.2 | 0 | 0 | 0 | 0 | 0 | 0 |
| -0.2 | 1 | 0.8 | 0.6 | 0.4 | 0.2 | 0 | 0 | 0 | 0 | 0 | 0 |
| -0.25 | 1 | 0.8 | 0.6 | 0.4 | 0.2 | 0 | 0 | 0 | 0 | 0 | 0 |
| -0.3 | 1 | 0.8 | 0.6 | 0.4 | 0.2 | 0 | 0 | 0 | 0 | 0 | 0 |
| -0.35 | 1 | 0.8 | 0.6 | 0.4 | 0.2 | 0 | 0 | 0 | 0 | 0 | 0 |
| -0.4 | 1 | 0.8 | 0.6 | 0.4 | 0.2 | 0 | 0 | 0 | 0 | 0 | 0 |

Fig. 5

| Deflection of the suspension $s_{Susp}$ \ Speed of compression $v_{Susp}$ | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| 0 | 1 | 0.8 | 0.6 | 0.4 | 0.2 | 0 | 0 | 0 | 0 | 0 | 0 |
| -0.05 | 0.833333 | 0.666667 | 0.5 | 0.333333 | 0.166667 | 0 | 0 | 0 | 0 | 0 | 0 |
| -0.1 | 0.666667 | 0.533333 | 0.4 | 0.266667 | 0.133333 | 0 | 0 | 0 | 0 | 0 | 0 |
| -0.15 | 0.5 | 0.4 | 0.3 | 0.2 | 0.1 | 0 | 0 | 0 | 0 | 0 | 0 |
| -0.2 | 0.333333 | 0.266667 | 0.2 | 0.133333 | 0.066667 | 0 | 0 | 0 | 0 | 0 | 0 |
| -0.25 | 0.166667 | 0.133333 | 0.1 | 0.066667 | 0.033333 | 0 | 0 | 0 | 0 | 0 | 0 |
| -0.3 | 0 | 0 | 0 | 0 | 0 | 0 | 0 | 0 | 0 | 0 | 0 |
| -0.35 | 0 | 0 | 0 | 0 | 0 | 0 | 0 | 0 | 0 | 0 | 0 |
| -0.4 | 0 | 0 | 0 | 0 | 0 | 0 | 0 | 0 | 0 | 0 | 0 |

Fig. 6

| Deflection of the suspension $S_{Susp}$ | Speed of compression $v_{SuspAct}$ | | | | | | | | | | |
|---|---|---|---|---|---|---|---|---|---|---|---|
| | 0 | 0.1 | 0.2 | 0.3 | 0.4 | 0.5 | 0.6 | 0.7 | 0.8 | 0.9 | 1 |
| 0 | 2000 | 1600 | 1200 | 800 | 400 | 0 | 0 | 0 | 0 | 0 | 0 |
| -0.05 | 1666.667 | 1333.333 | 1000 | 666.6667 | 333.3333 | 0 | 0 | 0 | 0 | 0 | 0 |
| -0.1 | 1333.333 | 1066.667 | 800 | 533.3333 | 266.6667 | 0 | 0 | 0 | 0 | 0 | 0 |
| -0.15 | 1000 | 800 | 600 | 400 | 200 | 0 | 0 | 0 | 0 | 0 | 0 |
| -0.2 | 666.6667 | 533.3333 | 400 | 266.6667 | 133.3333 | 0 | 0 | 0 | 0 | 0 | 0 |
| -0.25 | 333.3333 | 266.6667 | 200 | 133.3333 | 66.66667 | 0 | 0 | 0 | 0 | 0 | 0 |
| -0.3 | 0 | 0 | 0 | 0 | 0 | 0 | 0 | 0 | 0 | 0 | 0 |
| -0.35 | 0 | 0 | 0 | 0 | 0 | 0 | 0 | 0 | 0 | 0 | 0 |
| -0.4 | 0 | 0 | 0 | 0 | 0 | 0 | 0 | 0 | 0 | 0 | 0 |

Fig. 7

A method for controlling a semi-active or active suspension of at least one wheel of a vehicle, which comprises an arrangement of a suspension and a vibration damper having at least one actuating element for regulating damper forces, which can be adjusted between hard and soft damping characteristics in various stages or continuously by use of at least one actuator is provided. The method includes the steps of moving the vehicle on a roadway, wherein the at least one actuating element has been set in a moderate setting between hard and soft, and the at least one wheel is in a normal position, detecting a potential anomaly in the surface of the roadway comprising at least one falling edge, a bottom, and a rising edge, and switching the at least one actuating element into a hardest setting when a fast, negative vertical movement of the suspension is detected. The method also includes the steps of switching the at least one actuating element into a setting that corresponds to a minimally possible damper force request once an end of a spring travel of the suspension has been reached or once the bottom or the rising edge of the anomaly has been reached by the at least one wheel, and continuously adjusting the at least one actuating element in the setting according to a force request as a function of the speed and/or the deflection of the suspension.

SITUATION-DEPENDENT DAMPING OF THE VERTICAL WHEEL OSCILLATION

CROSS-REFERENCE TO RELATED APPLICATION

This application claims foreign priority benefits under 35 U.S.C. § 119(a)-(d) to German Patent Application No. 102021123390.9 filed on Sep. 9, 2021, which is hereby incorporated by reference in its entirety.

FIELD OF THE DISCLOSURE

The present disclosure generally relates to a method for damping the vertical wheel oscillation of a vehicle and to a vehicle for carrying out the method.

BACKGROUND OF THE DISCLOSURE

When traversing a rough or uneven roadway, oscillations of the motor vehicle wheels are typically generated, due to the vertical force of the relevant vehicle with respect to the roadway varying. As a result, the ride controllability of the vehicle can be affected. In order to allow the oscillations to subside as quickly as possible, vibration dampers are typically provided in the wheel suspension.

Vehicles frequently employ active, semi- and/or adaptive suspension systems of the wheels, in order to control vertical movements of the wheels. The suspension features, such as, for example, damping and stiffness, are selectively adapted to abnormal roadway conditions. An adaptive suspension system may provide what is referred to as Continuously Controlled Damping (CCD).

When a relative movement occurs between a wheel of a vehicle and the relevant roadway surface, changes occur in the transmission of force from the wheel onto the roadway, which can cause road adhesion to be reduced. A vertical vibration movement arising as a result is also referred to as vertical wheel oscillation.

Passive oscillating actuators dampen the vertical vibration movement of the wheel and of the vehicle body. Damping control systems, which are directed, in particular, to the comfort of the vehicle occupants, for example, the CCD, function according to the known "skyhook" principle, wherein the necessary damping force is dependent upon the absolute vertical speed of the vehicle body (i.e., the unsprung mass). These generally may be better suited than passive dampers for damping a vertical vehicle movement. Comfort comes at the expense of a vertical wheel oscillation in this case.

Approaches are known that increase the driving comfort by adjusting dampers to be hard when a roadway anomaly is reached, such as a pothole. A pothole is detected when, for example, a high vertical speed of the wheel is detected. A duration of a hard damper setting that is too long may reduce the driving comfort.

Once the bottom of the anomaly or the end of the anomaly has been reached, a soft damper characteristic may be selected. In this situation, for example, height sensors may be utilized in order to be able to control the settings of the damping in the area of the anomaly. If soft damper settings are maintained for too long, this can result in adverse effects on the ride of the vehicle, however, and, thereby, also to a reduction of the driving comfort. This applies, for example, when the described changes of the damper setting are based on a piece of false positive information regarding a pothole, such as when either no or only a small pothole has been passed over. It would be desirable to enhance the damping control with regard to the driving comfort.

SUMMARY OF THE DISCLOSURE

According to a first aspect of the present disclosure, a method for controlling a semi-active or active suspension of at least one wheel of a vehicle, which comprises an arrangement of a suspension and a vibration damper having at least one actuating element for regulating damper forces, which can be adjusted between hard and soft damping characteristics in various stages or continuously by use of at least one actuator is provided. The method includes the steps of moving the vehicle on a roadway, wherein the at least one actuating element has been set in a moderate setting between hard and soft, and the at least one wheel is in a normal position, detecting a potential anomaly in the surface of the roadway comprising at least one falling edge, a bottom, and a rising edge, and switching the at least one actuating element into a hardest setting when a fast, negative vertical movement of the suspension is detected. The method also includes the steps of switching the at least one actuating element into a setting that corresponds to a minimally possible damper force request once an end of a spring travel of the suspension has been reached or once the bottom or the rising edge of the anomaly has been reached by the at least one wheel, and continuously adjusting the at least one actuating element in the setting according to a force request as a function of the speed and/or the deflection of the suspension.

According to a second aspect of the present disclosure, a vehicle is provided and includes at least one wheel, a semi-active or active suspension of the at least one wheel, which comprises an arrangement of a suspension and a vibration damper having at least one actuating element, which can be adjusted between a hardest setting and a softest setting in various stages or continuously by use of at least one actuator, and a control unit coupled to the at least one actuator for controlling the semi-active or active suspension according to a method. The method includes the steps of moving the vehicle on a roadway, wherein the at least one actuating element has been set in a moderate setting between hard and soft, and the at least one wheel is in a normal position, detecting a potential anomaly in the surface of the roadway comprising at least one falling edge, a bottom, and a rising edge, and switching the at least one actuating element into a hardest setting when a fast, negative vertical movement of the suspension is detected. The method also includes the steps of switching the at least one actuating element into a setting that corresponds to a minimally possible damper force request once an end of the spring travel of the suspension has been reached or once a bottom or the rising edge of the anomaly has been reached by the at least one wheel, and continuously adjusting the at least one actuating element in the setting according to a force request as a function of the speed and/or the deflection of the suspension.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

Figure 1:
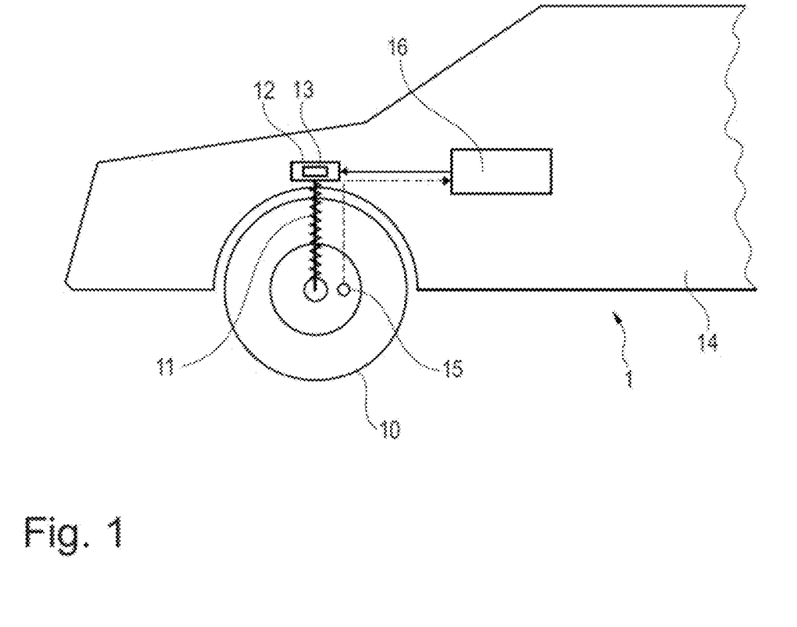
FIG. 1 is a schematic side view representation of the front of a vehicle having a wheel and suspension system.

In FIG. 1, the front portion of a vehicle 1, such as a motor vehicle, is illustrated according to one embodiment. A wheel 10 is shown, the suspension system of which comprises, among other things, a suspension 11 and a vibration damper 12. An actuating element 13 is arranged in the vibration damper 12. The actuating element 13 is set by an actuator. The vibration damper 12 may be made up of multiple elements and can also have multiple actuating elements and actuators, which are not represented here for the sake of clarity. The suspension system can be a Continuously Controlled Damping (CCD) system, an active suspension, or a semi-active suspension and/or comprise actively controlled stabilizers. The vibration damper 12 dampens the transmission of vibrations from the wheel 10 onto the body 14 of the vehicle 1.

The vehicle 1 has at least one sensor, which is connected to a control unit 16. The sensor in this example is a height sensor 15, which is designed, in particular, for measuring the change in height of the wheel when passing over an anomaly of a roadway. The sensor 15 transmits information regarding changes in height of the wheel to the control unit 16. The vehicle 1 can have further sensors, which are designed for detecting roadway anomalies and transmitting information to the control unit 16. Therefore, the sensors can be utilized in connection with the control unit 16 for controlling the vibration damper 12. The control unit 16 is designed for evaluating the signals transmitted from the sensor 15 and/or further sensors and transmitting control commands to the actuators 13.

A damping control system according to the known skyhook principle is utilized in order to provide a high level of travel comfort. Additional force requests are transmitted to the actuators of the dampers 12 in order to avoid an intense wheel oscillation when passing over roadway anomalies. Parameters for the movement (speed and deflection) of the suspension 11 are detected in a software-controlled manner. The software is implemented in the control unit 16 which may include process circuitry such as a microprocessor and memory. Alternatively, a height difference of the position of the wheel 10 can be detected by use of the sensor 15 and the relevant information can be transmitted to the control unit 16. On the basis thereof, the control unit 16 calculates a force request on the vibration damper 12. In addition, it is calculated whether the wheel 10 has actually impacted an anomaly, or not.

Figure 2:
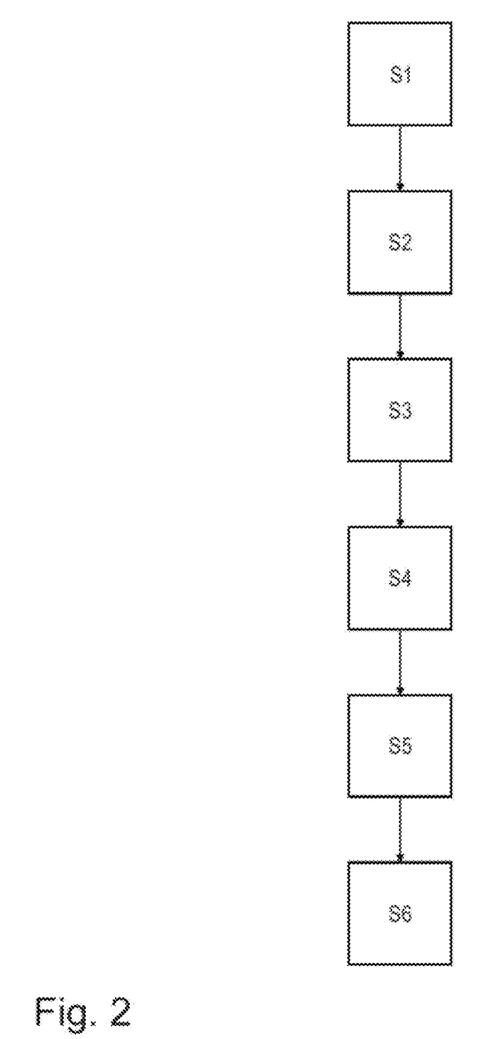
FIG. 2 is a flowchart illustrating one embodiment of a method.
Figure 3:
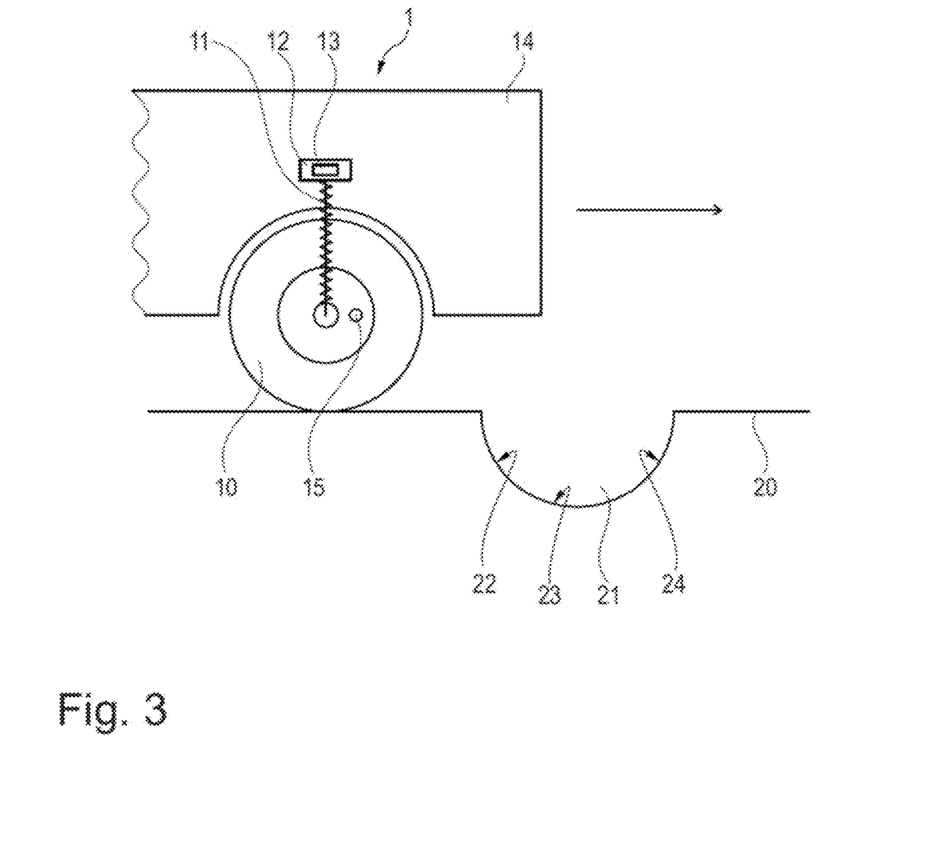
FIG. 3 is a side view of the vehicle of FIG. 1 on a roadway.

In a method for controlling a semi-active suspension system according to the flowchart shown in FIG. 2, in a first step S1, the vehicle 1 is moved on a roadway 20. The situation of the vehicle 1 on the roadway 20 is represented in FIG. 3. The roadway 20 may be an asphalted road. The vehicle 1 therefore moves in a certain direction, for example, in the forward direction, as indicated by the arrow.

The vehicle 1 reaches an anomaly in the roadway 20, which was detected in a second step S2 by a camera of the vehicle 1. The anomaly in this example is a pothole 21. The pothole 21 comprises a falling edge 22, a bottom 23, and a rising edge 24.

Once the falling edge 22 has been reached, it is detected, in a third step S3 by use of a software function on the basis of a speed of the deflection of the suspension, that the wheel 10 has reached the pothole 21. The pothole 21 is considered to be an actual pothole, because a negative threshold value of the speed of the suspension has been exceeded. The appropriate software is implemented in the control unit 16 such as executed by a microprocessor. In step S3, the control unit 16 then transmits a control signal to the actuators of the actuating element 13, which switch the actuating element 13 into its hardest setting shortly once the falling edge 21 has been reached.

If the bottom 23 or the rising edge 24 has been reached by the wheel 10 or the end of the spring travel of the suspension 11 has been reached, the actuating element 13 is switched, in a fourth step S4, into a setting that corresponds to a minimally possible force request (here: 0).

If the wheel 10 begins to move back into its normal position once the end of the spring travel of the suspension 11 has been reached or if the bottom 23 or the rising edge 24 of the pothole 21 has been reached by the wheel 10, then, in a fifth step S5, the actuator 13 is adjusted according to a force request on the actuating element 13 to be calculated. The force request is calculated in the control unit 16. Formula (I) is used in this embodiment, as described herein.

In a sixth step S6, the actuating element is continuously readjusted in the aforementioned setting according to a force request as a function of the speed and/or the deflection of the suspension. In the process, either the settings of the damping 12 are adapted according to an ascertained force request if a pothole has been passed over, which can be ascertained, for example, by activating the end stop control of the suspension, or the skyhook function quickly reassumes the control of the damping 12 if a pothole has not been passed over, which can be evaluated, for example, when the suspension, with a small deflection, returns to its rest position at a low speed.

Figure 4:
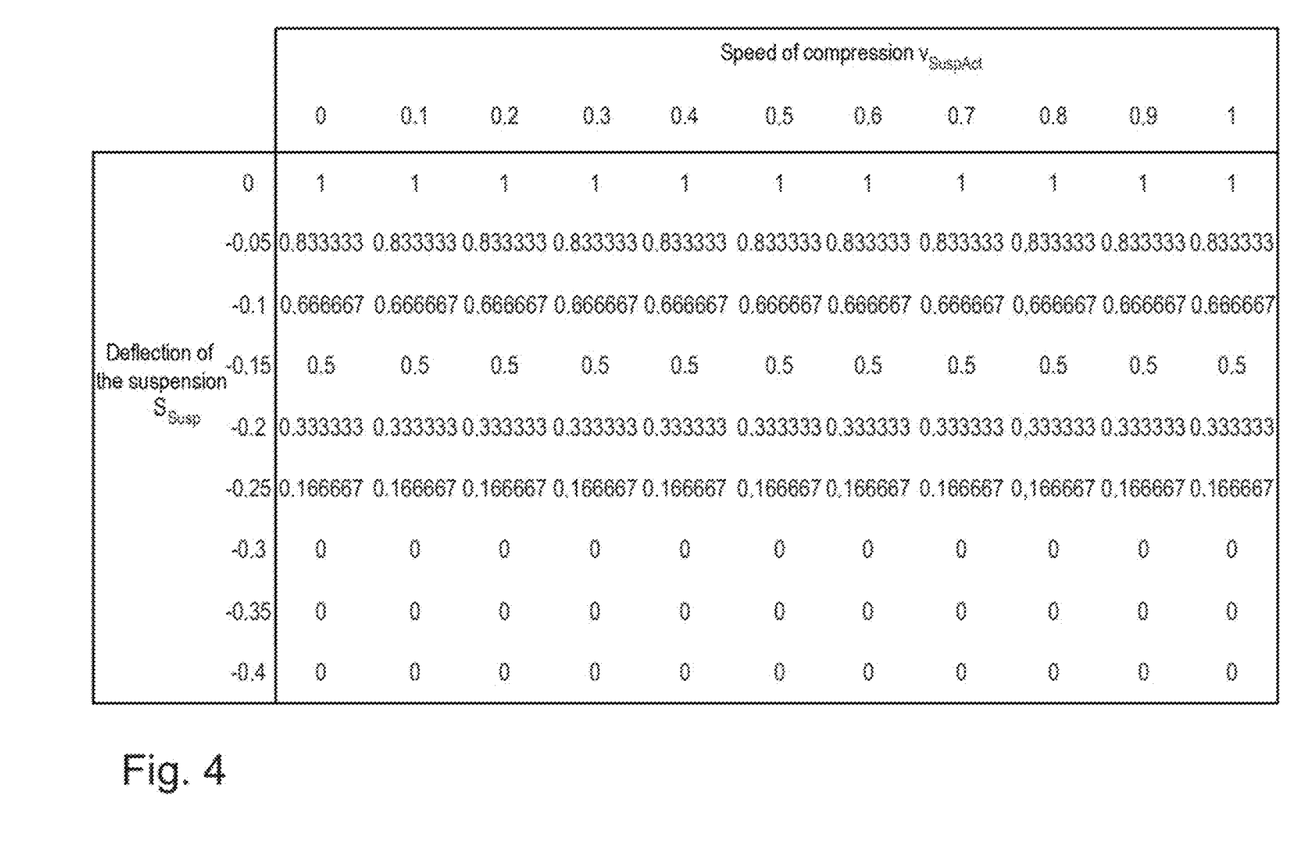
FIG. 4 is a table identified as Table 1 with calculations of a force reduction for the dampers as a function of a dimension of an anomaly that has been reached.
Figure 5:
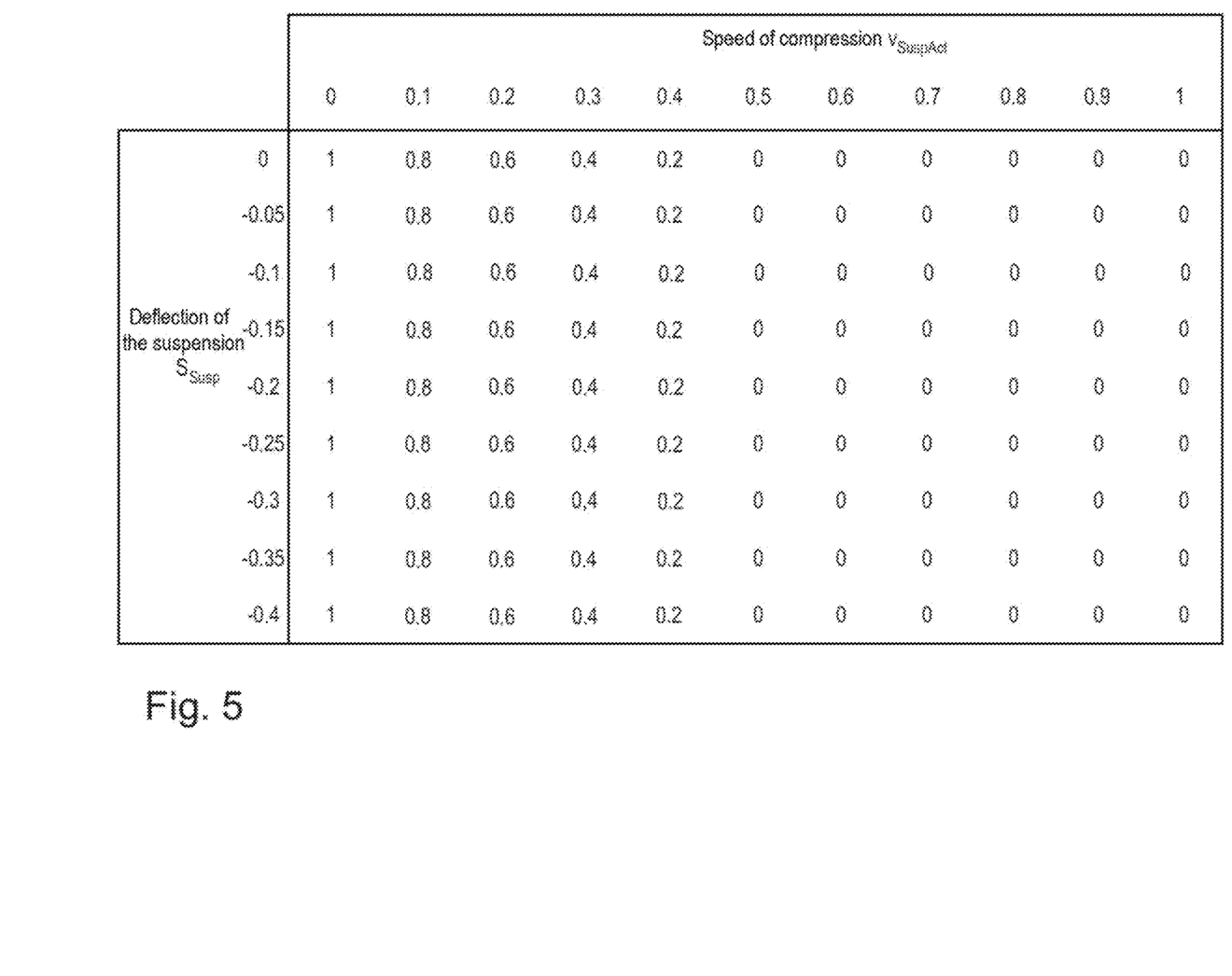
FIG. 5 is a table identified as Table 2 with calculations of a force reduction for the dampers as a function of the vehicle speed.

Exemplary values of the calculations are represented in Tables 1-4. The values on the basis of the distance of the compression $a_S$ and of the speed of the compression, the total gain is calculated as a function of the compression (Table 1 in FIG. 4) and as a function of the speed of the compression (Table 2 in FIG. 5). The values were obtained under the condition that the force request on the skyhook system $F_{SH}$ is 2000, the threshold value of the speed of the vehicle $v_{tF}$ is 0.0, and the threshold value of the displacement of the suspension $d_{tS}$ is −0.3. The propagation time is set equal to 1.

Figure 6:
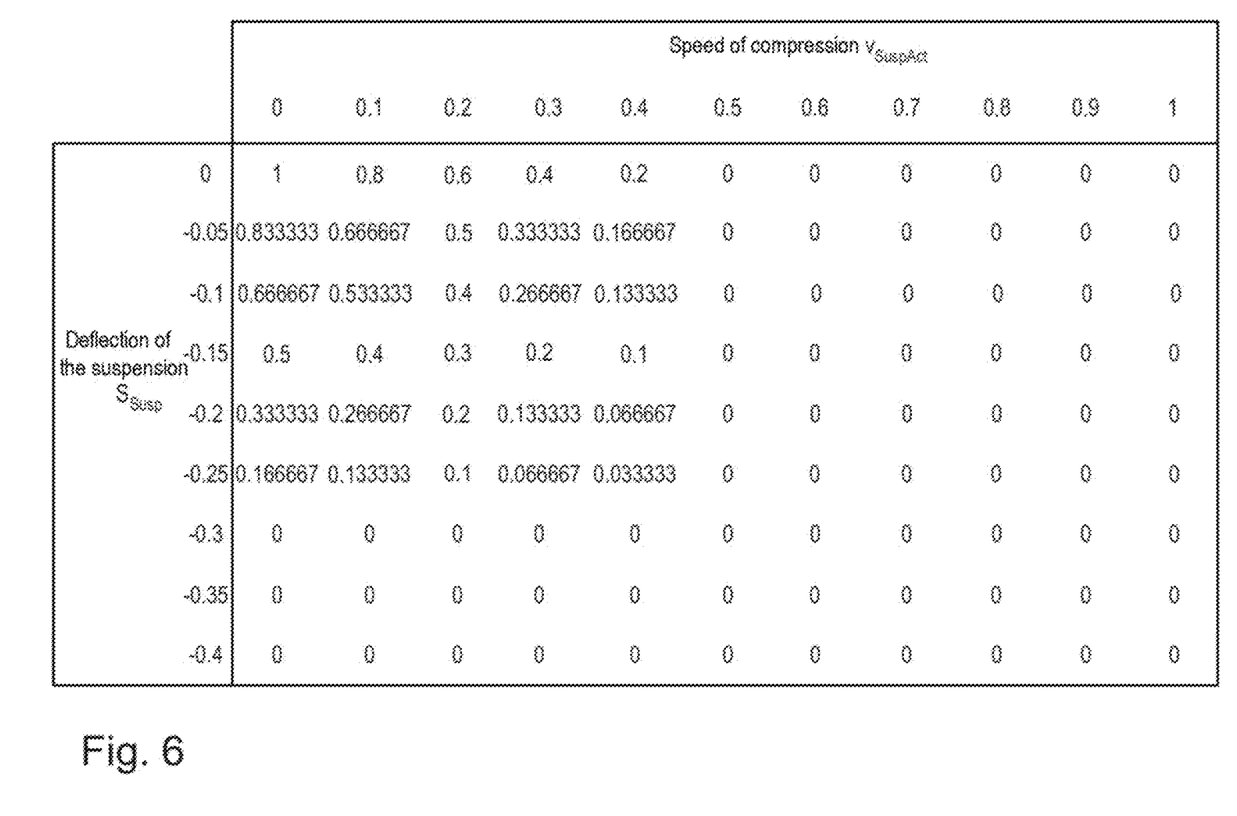
FIG. 6 is a table identified as Table 3 with calculations of a force reduction that are averaged from Table 1 and Table 2.
Figure 7:
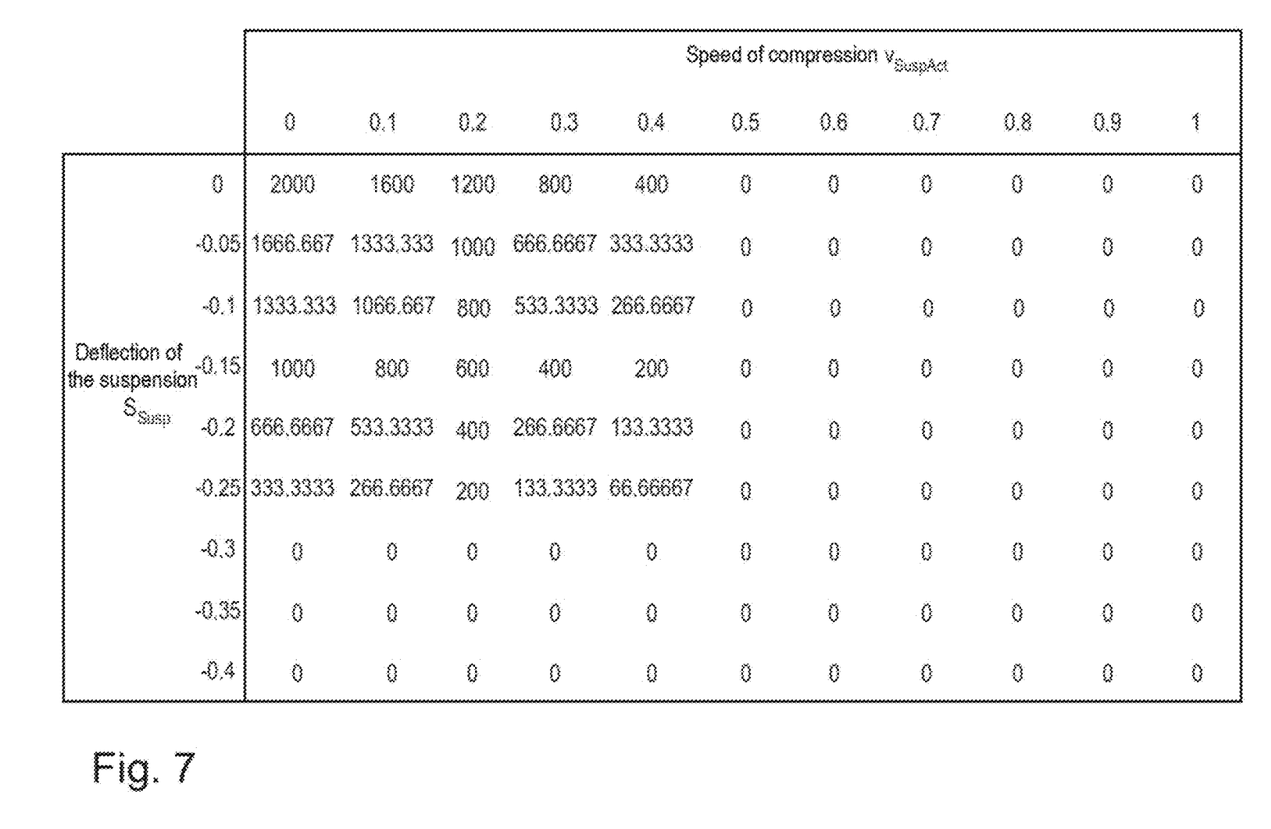
FIG. 7 is a table identified as Table 4 with calculations of a force request on the damping system.

The total gain is represented in Table 3 in FIG. 6. Values in positions in Table 1 are multiplied by values of the corresponding positions. The values of the total gain that are obtained are multiplied by the values of the settings of the skyhook system in order to calculate the force request $F_D$ on the dampers (Table 4 in FIG. 7).

As described above, the force request $F_D$ is calculated as a function of threshold values of the speed of the compression of the suspension 11 and of the deflection of the suspension 11. The force request is equal to 0 when a predefined threshold value of the speed of the compression is exceeded. At a high speed the damping is therefore controlled by use of the skyhook system without additional force modifications. The force request is also equal to 0 when the deflection of the suspension 11 remains below a certain value. Therefore, the damping in the case of a low effect on the suspension 11 is also controlled by use of the skyhook system without additional force modifications.

By way of example, the damping can be adjusted as follows: 1.) If a distance of the compression is high and a speed of the vehicle is low, it is likely that a pothole has been impacted. Therefore, a low force of the damper is set according to a corresponding force request $F_D$. 2.) If a distance of the compression is low and a speed of the vehicle is high, it is likely that a pothole has been impacted. Therefore, a low force of the damper is set according to a corresponding force request $F_D$. 3.) If a distance of the compression is low and a speed of the vehicle is low, it is likely that a pothole has not been impacted. The skyhook system reassumes the control of the damping. Further settings are possible, of course.

It can be ascertained that a pothole has been passed over, for example, by activating the end stop control of the suspension. A sensor signal can be, for example, evaluated as false positive when the suspension, with a small deflection, returns to its normal position at a low speed and the end stop control has not been activated after a certain propagation time. False positive signals can be represented, for example, by the following formulas IV and V:

$$\text{ABS}(S) < S_{Thr} \;\&\&\; \text{ABS}(v) < V_{Thr} \quad \text{(IV)}$$

$$\text{ABS}(S) < 2 * S_{Thr} \;\&\&\; \text{ABS}(v) < V_{Thr} * 0.5 \quad \text{(V)}$$

wherein S=0 corresponds to the normal position of the suspension.

The formulas (IV, V) cover situations in which a pothole has not been impacted, i.e., the suspension (11) approaches the normal position from below, as well as in which a pothole has been impacted, i.e., the suspension (11) approaches the normal position from above. The formula (V) permits evaluations to be carried out when the speed of the compression is particularly low at a predefined deflection.

A first aspect of the disclosure relates to a method for controlling a semi-active or active suspension of at least one wheel of a vehicle, which comprises an arrangement of a suspension and a vibration damper having at least one actuating element for regulating damper forces, which can be adjusted between hard and soft damping characteristics in various stages or continuously by use of at least one actuator, including the steps:
moving the vehicle on a roadway, wherein the actuator has been set in a moderate setting between hard and soft, and the wheel is in a normal position,
detecting a potential anomaly in the surface of the roadway comprising at least one falling edge, a bottom, and a rising edge,
switching the actuating element into its hardest setting when a fast, negative vertical movement of the suspension is detected,
switching the actuating element into a setting that corresponds to a minimally possible damper force request once the end of the spring travel of the suspension has been reached or once the bottom or the rising edge of the anomaly has been reached by the wheel,
continuously adjusting the actuating element in the aforementioned setting according to a force request as a function of the speed and/or the deflection of the suspension.

The method according to the disclosure advantageously expands known approaches that ensure that a wheel does not drop too far into an anomaly by switching the damping to a hard setting. This is also part of the method according to the disclosure, wherein, by calculating the force request, the driving comfort is increased in this case, because the damper setting, after having been switched to soft, remains soft for as long as the force request is minimal.

The method according to the present disclosure requires that a potential anomaly has been detected by a function of the vehicle. This may be carried out by functions of the vehicle that are known to those skilled in the art. The concept of the potential anomaly is therefore to be understood to mean that this can be an anomaly, but also false positive messages, i.e., in fact, an anomaly has not been passed over. With the method according to the disclosure, the damping is adjusted with regard to a high driving comfort in the case of actual anomalies as well as in the case of false positive messages.

In the process, the force request is preferably equal to 0 when the speed of the suspension is high, because, in this situation, it is highly likely that the rising edge of a pothole has been impacted (in a positive direction, i.e., during compression), or when the deflection of the suspension is high, because, in this case, the wheel has highly likely dropped into a pothole (in a positive direction, i.e., during compression). If these values are too low, i.e., for example, remain below the predefined threshold values, the force request does not become minimal and, thereby, the damper setting is not switched to soft. Therefore, the driving comfort is not adversely affected by unnecessarily switching the damping to soft when a potential anomaly is passed over that has dimensions that are too small to qualify as a pothole and to have significant effects on the suspension. In this sense, the comfort of the vehicle occupants is increased when a pothole has been impacted as well as when a pothole has not been impacted. It is essential that the force request is set to 0 in the instant at which the suspension no longer drops, namely either once a greatest possible extension (end stop control) has been reached or once a boundary of the anomaly (bottom or edge) has been impacted.

In other words, according to the disclosure, the force request is calculated as a function of the travel of the deflection of the suspension, i.e., to what extent the suspension is deflected. Therefore, the deflection of the suspension is incorporated into the calculation of the damper setting. When a speed is low and a deflection is high, for example, it is highly likely that an anomaly has been impacted. Thereupon, the force request becomes low (low in the relative sense with respect to the range of the possible force requests). The force request is preferably set equal to zero when a predefined threshold value of the travel of the deflection is exceeded.

Moreover, according to the disclosure, the force request is calculated as a function of the speed of the compression of the suspension. The probability that an anomaly has been impacted is high if the speed of the compression is relatively high once the rising edge of the anomaly has been impacted. Thereupon, the force request becomes low. The force request is preferably set equal to zero when a predefined threshold value of the speed of the compression is exceeded. The speed of the compression and the travel of the deflection are evaluated as a combination in which these are weighed against each other. Situations are also covered by the threshold values, in which slightly deviating values still result in a force request of 0, i.e., when the speed is slightly below a very high value and the travel of the displacement is slightly above 0.

With respect to a movement of the suspension, "fast" is understood to mean that a certain threshold value of the speed of the extension and/or compression is exceeded. The relative terms "high," "moderate," and "low" with respect to the speed of the suspension and the travel of the deflection of the suspension are also characterized here by certain threshold values. The highest achievable 10% of the values are high, the lowest achievable 10% of the values are low, and the values therebetween are in the middle.

The vibration damping is to be understood here as a software function in which a force request of the skyhook function is added. The force request can correspond to a negative or positive amount, i.e., the vibration damping can be reduced or increased, respectively, by the skyhook function. As a result, the intensity of the vibration damping can be advantageously dynamically adapted to the driving situations.

A roadway is understood to include, in particular, an asphalted or concrete road, but can also be understood to include another underlying surface, such as, for example, a cobblestone road or a dirt road. A vehicle is understood to be, in particular, a motor vehicle.

When unaffected by a roadway anomaly, the wheel is located in a normal position in which the suspension is not deflected perpendicularly in a direction (in the direction of the roadway or the body) outside a certain tolerance range. The perpendicular position of the wheel in relation to the vehicle is briefly changed due to the wheel dropping into a pothole and due to the wheel impacting the bottom.

If the travel of the deflection is below the threshold value, but the speed is high, it is highly likely that an anomaly has been impacted. Thereupon, the force request becomes low, but not equal to 0.

A small deflection at a low speed of the vehicle means that the likelihood that an anomaly has been impacted is low. Preferably, at a speed of the vehicle below the threshold value and a speed of the suspension below the threshold value, the anomaly is evaluated as false positive. In this case, the skyhook system completely reassumes the control gradually, ideally, however, as quickly as possible.

According to one embodiment, the force request is calculated according to the following formula (I):

$$F_D = F_{SH} * K_{vel} * K_{defl} * \text{MAX}(0, K_{time}) \quad (I),$$

wherein $F_D$ is the force request on the damping and $F_{SH}$ is the force request of the skyhook system of the vehicle by vehicle-specific software, and the term MAX is provided for ensuring that the factor becomes equal to 0 when the speed of the compression is higher than the threshold value, $$K_{vel} = \text{MAX}(0, v_{ThrPh} - \text{ABS}(V_{SuspAct})) * 1/v_{ThrPh} \quad (II),$$

wherein $v_{ThrPh}$ is a threshold value of the speed of the suspension, above which $F_D$ is equal to zero, and $v_{SuspAct}$ stands for the speed of the suspension, and the term ABS stands for an absolute value, i.e., without a sign, $$K_{defl} = \text{MAX}(0, S_{Susp} + \text{ABS}(S_{ThrPh})) * 1/\text{ABS}(S_{ThrPh}) \quad (III), \text{ and}$$

wherein $S_{Susp}$ is the travel of the deflection of the suspension and $S_{ThrPh}$ is a threshold value of the deflection of the suspension, below which $F_D$ is equal to 0, and $$K_{time} = \min(1, K_{time} + \text{SampleTime} * x) \quad (IV),$$

wherein $K_{time}$ is a measure for the propagation time, wherein, at the start of the function, $K_{time}$ is set to −1 and then grows by the factor SampleTime*x at each step over time until it is equal to 1.

Advantageously, whether a potential anomaly is past, if this actually was an anomaly, or whether this was a false positive reporting of an anomaly, i.e., an anomaly has not been passed over, is incorporated into the method. In the process, either an activation of the end stop control of the suspension during compression is utilized (the wheel has impacted the rising edge), or the suspension returns to its normal position (an anomaly was not passed over) with a low speed of compression (below a certain threshold value). It is particularly advantageous that the control is completely returned to the skyhook system as quickly as possible and, at low values of the speed and of the deflection of the suspension, the skyhook system already partially flows into the force request on the basis of the formula (I) before the control is completely returned.

The ascertainment of the propagation time has been introduced into the formula I in order to detect false positive signals. If the end stop control has not been activated after a certain time or the bottom of a potential pothole has not been impacted, the signal was false positive.

Preferably, the force request according to formula (I) is set equal to 0 when the speed or the deflection of the suspension is high. Advantageously, use is made of the fact that either the speed is high and the deflection is low, or the deflection is high and the speed is low when an actual anomaly is impacted. As a result, the vibration damping remains in a soft setting when an anomaly has actually been impacted.

Preferably, the force request is set higher than 0, but lower than the actual force request by the skyhook system when the speed is low and the deflection is moderate, or vice versa, the speed is moderate and the deflection is low. Thereupon, it is highly likely that the anomaly is small and the driving comfort can be ensured at a reduced skyhook level.

Preferably, the force request is set approximately to that of the skyhook system when the speed and the deflection are low. Use is made of the fact that an anomaly has not been impacted. In this sense, advantageously, the control can be returned to the skyhook system as quickly as possible.

A second aspect of the disclosure relates to a vehicle having a semi-active suspension of at least one wheel, which comprises an arrangement of a suspension and a vibration damper having at least one actuating element, which can be adjusted between a hardest setting and a softest setting in various stages or continuously by use of at least one actuator, and the actuator is connected to a control unit, which is designed for controlling a method according to the disclosure. The advantages of the vehicle correspond to the advantages of the method according to the disclosure.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method for controlling a semi-active or active suspension of at least one wheel of a vehicle, which comprises an arrangement of a suspension and a vibration damper having at least one actuating element for regulating damper forces, which can be adjusted between hard and soft damping characteristics in various stages or continuously by use of at least one actuator, the method comprising the steps of:
   moving the vehicle on a roadway, wherein the at least one actuating element has been set in a moderate setting between hard and soft, and the at least one wheel is in a normal position;
   detecting a potential anomaly in the surface of the roadway comprising at least one falling edge, a bottom, and a rising edge;
   switching the at least one actuating element into a hardest setting when a fast, negative vertical movement of the suspension is detected;
   switching the at least one actuating element into a setting that corresponds to a minimally possible damper force request once an end of a spring travel of the suspension has been reached or once the bottom or the rising edge of the anomaly has been reached by the at least one wheel; and
   continuously adjusting the at least one actuating element in the setting according to a force request as a function of the speed and/or the deflection of the suspension, wherein the force request is set equal to zero when a predefined threshold value of the deflection of the suspension is not exceeded.

2. The method according to claim 1, wherein the force request is calculated according to the formula (I):

$$F_D = F_{SH} * K_{vel} * K_{defl} * \text{MAX}(0, K_{time}) \qquad (I),$$

wherein $F_D$ is a force request on the damping and $F_{SH}$ is a force request of a skyhook system of the vehicle by vehicle-specific software, and the term MAX is provided for ensuring that the factor becomes equal to 0 when the speed of the compression is higher than the threshold value, $$K_{vel} = \text{MAX}(0, v_{ThrPh} - \text{ABS}(v_{SuspAct})) * 1/v_{ThrPh} \qquad (II),$$

wherein $v_{ThrPh}$ is a threshold value of the speed of the suspension, above which $F_D$ is equal to zero, and $v_{SuspAct}$ stands for the speed of the suspension, and the term ABS stands for an absolute value, $$K_{defl} = \text{MAX}(0, S_{Susp} + \text{ABS}(S_{ThrPh})) * 1/\text{ABS}(S_{ThrPh}) \qquad (III), \text{ and}$$

wherein $S_{Susp}$ is the travel of the deflection of the suspension and $S_{ThrPh}$ is a threshold value of the deflection of the suspension, below which FD is equal to 0, and $$K_{time} = \min(1, K_{time} + \text{SampleTime} * x) \qquad (IV),$$

wherein $K_{time}$ is a measure for the propagation time, wherein, at the start of the function, $K_{time}$ is set to −1 and then grows by the factor SampleTime*x at each step over time until it is equal to 1.

3. The method according to claim 2, wherein the force request according to the formula (I) is set equal to 0 when the speed or the deflection of the suspension is high.

4. The method according to claim 3, wherein the force request is set higher than 0, but lower than the actual force request by the skyhook system when the speed is low and the deflection is moderate, or vice versa, the speed is moderate and the deflection is low.

5. The method according to claim 4, wherein the force request is set approximately to that of the skyhook system when the speed and the deflection are low.

6. A method for controlling a semi-active or active suspension of at least one wheel of a vehicle, which comprises an arrangement of a suspension and a vibration damper having at least one actuating element for regulating damper forces, which can be adjusted between hard and soft damping characteristics in various stages or continuously by use of at least one actuator, the method comprising the steps of:
   moving the vehicle on a roadway, wherein the at least one actuating element has been set in a moderate setting between hard and soft, and the at least one wheel is in a normal position;
   detecting a potential anomaly in the surface of the roadway comprising at least one falling edge, a bottom, and a rising edge;
   switching the at least one actuating element into a hardest setting when a fast, negative vertical movement of the suspension is detected;
   switching the at least one actuating element into a setting that corresponds to a minimally possible damper force request once an end of a spring travel of the suspension has been reached or once the bottom or the rising edge of the anomaly has been reached by the at least one wheel; and
   continuously adjusting the at least one actuating element in the setting according to a force request as a function of the speed and/or the deflection of the suspension, wherein the force request becomes equal to 0 when a predefined threshold value of the speed of the compression of the suspension is exceeded.

7. A vehicle comprising:
   at least one wheel;
   a semi-active or active suspension of the at least one wheel, which comprises an arrangement of a suspension and a vibration damper having at least one actuating element, which can be adjusted between a hardest setting and a softest setting in various stages or continuously by use of at least one actuator; and
   a control unit coupled to the at least one actuator for controlling the semi-active or active suspension according to a method comprising the steps of:
     moving the vehicle on a roadway, wherein the at least one actuating element has been set in a moderate setting between hard and soft, and the at least one wheel is in a normal position;
     detecting a potential anomaly in the surface of the roadway comprising at least one falling edge, a bottom, and a rising edge;
     switching the at least one actuating element into a hardest setting when a fast, negative vertical movement of the suspension is detected;
     switching the at least one actuating element into a setting that corresponds to a minimally possible damper force request once an end of the spring travel of the suspension has been reached or once a bottom or the rising edge of the anomaly has been reached by the at least one wheel; and
   continuously adjusting the at least one actuating element in the setting according to a force request as a function of the speed and/or the deflection of the suspension, wherein the force request is calculated according to the formula (I):

$$F_D = F_{SH} * K_{vel} * K_{defl} * \text{MAX}(0, K_{time}) \qquad (I),$$

wherein $F_D$ is a force request on the damping and $F_{SH}$ is a force request of a skyhook system of the vehicle by vehicle-specific software, and the term MAX is provided for ensuring that the factor becomes equal to 0 when the speed of the compression is higher than the threshold value, $$K_{vel} = \text{MAX}(0, v_{ThrPh} - \text{ABS}(v_{SuspAct})) * 1/v_{ThrPh} \quad \text{(II),}$$

wherein $v_{ThrPh}$ is a threshold value of the speed of the suspension, above which $F_D$ is equal to zero, and $v_{SuspAct}$ stands for the speed of the suspension, and the term ABS stands for an absolute value, $$K_{defl} = \text{MAX}(0, S_{Susp} + \text{ABS}(S_{ThrPh})) * 1/\text{ABS}(S_{ThrPh}) \quad \text{(III), and}$$

wherein $S_{Susp}$ is the travel of the deflection of the suspension and $S_{ThrPh}$ is a threshold value of the deflection of the suspension, below which FD is equal to 0, and $$K_{time} = \min(1, K_{time} + \text{SampleTime} * x) \quad \text{(IV),}$$

wherein $K_{time}$ is a measure for the propagation time, wherein, at the start of the function, $K_{time}$ is set to −1 and then grows by the factor SampleTime*x at each step over time until it is equal to 1.

8. The vehicle according to claim 7, wherein the force request is set equal to zero when a predefined threshold value of the deflection of the suspension is not exceeded.

9. The vehicle according to claim 7, wherein the force request becomes equal to 0 when a predefined threshold value of the speed of the compression of the suspension is exceeded.

10. The vehicle according to claim 7, wherein the force request according to the formula (I) is set equal to 0 when the speed or the deflection of the suspension is high.

11. The vehicle according to claim 10, wherein the force request is set higher than 0, but lower than the actual force request by the skyhook system when the speed is low and the deflection is moderate, or vice versa, the speed is moderate and the deflection is low.

12. The vehicle according to claim 11, wherein the force request is set approximately to that of the skyhook system when the speed and the deflection are low.

* * * * *